United States Patent
Lim et al.

(10) Patent No.: US 10,514,822 B2
(45) Date of Patent: Dec. 24, 2019

(54) SYSTEMS AND METHODS FOR TEXT ENTRY FOR MULTI-USER TEXT-BASED COMMUNICATION

(71) Applicant: MOTOROLA SOLUTIONS, INC., Schaumburg, IL (US)

(72) Inventors: Bing Qin Lim, Pulau Pinang (MY); Boon Kheng Hooi, Kedah (MY); Wai Mun Lee, Penang (MY); Mun Yew Tham, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 377 days.

(21) Appl. No.: 15/245,793

(22) Filed: Aug. 24, 2016

(65) Prior Publication Data
US 2018/0059903 A1 Mar. 1, 2018

(51) Int. Cl.
| G06F 3/0481 | (2013.01) |
| G06F 3/02 | (2006.01) |
| G06F 3/0488 | (2013.01) |
| G06F 17/24 | (2006.01) |

(52) U.S. Cl.
CPC ............ *G06F 3/04817* (2013.01); *G06F 3/02* (2013.01); *G06F 3/04886* (2013.01); *G06F 17/24* (2013.01)

(58) Field of Classification Search
CPC ............................... G06F 3/02; G06F 3/04817
USPC ......................................................... 715/773
See application file for complete search history.

(56) References Cited

U.S. PATENT DOCUMENTS

| 6,525,997 B1* | 2/2003 | Narayanaswami .. G04G 9/0082 368/223 |
| 6,556,222 B1 | 4/2003 | Narayanaswami |
| 9,557,913 B2* | 1/2017 | Griffin ................ G06F 3/04886 |
| 2002/0057256 A1* | 5/2002 | Flack ................... G06F 1/1626 345/157 |
| 2006/0028450 A1* | 2/2006 | Suraqui ................ G06F 3/0237 345/169 |

(Continued)

OTHER PUBLICATIONS

PCT/US2017/044734 International Search Report and Written Opinion of the International Searching Authority dated Nov. 21, 2017 (13 pages).

(Continued)

Primary Examiner — Ryan F Pitaro
Assistant Examiner — Henry Orr
(74) Attorney, Agent, or Firm — Michael Best & Friedrich LLP

(57) ABSTRACT

Systems and methods described for text entry for multi-user text-based communication using a portable communication device with a graphical user interface shown on a display. A plurality of text character icons are displayed on a display by an electronic processor in a center area of the graphical user interface and messages are displayed along a perimeter area of the graphical user interface. A selection of one or more text character icons in the center area of the graphical user interface is detected and a new text message is generated based on the detected selection of the one or more text character icons. The new text message is chronologically inserted and displayed in accordance with the chronological sequence along the perimeter of the graphical user interface. The new text message is then transmitted from the device.

22 Claims, 21 Drawing Sheets

(56) References Cited

U.S. PATENT DOCUMENTS

| | | | | |
|---|---|---|---|---|
| 2007/0039036 | A1* | 2/2007 | Sullivan | H04N 7/163 725/133 |
| 2008/0055269 | A1* | 3/2008 | Lemay | G06F 3/0482 345/173 |
| 2008/0259045 | A1* | 10/2008 | Kim | G06F 3/0486 345/173 |
| 2013/0303213 | A1* | 11/2013 | Kennard | H04W 4/14 455/466 |
| 2014/0280578 | A1* | 9/2014 | Barat | G06F 15/17312 709/204 |
| 2014/0281956 | A1* | 9/2014 | Anderson | G06F 3/0482 715/702 |
| 2015/0127755 | A1* | 5/2015 | Roh | H04L 51/34 709/206 |
| 2015/0160832 | A1* | 6/2015 | Walkin | G06F 3/04883 715/765 |
| 2015/0248235 | A1* | 9/2015 | Offenberg | G06F 3/04886 715/773 |
| 2015/0331589 | A1* | 11/2015 | Kawakita | G06F 1/163 715/834 |
| 2016/0092040 | A1* | 3/2016 | Sherman | H04L 51/32 715/752 |
| 2016/0109861 | A1* | 4/2016 | Kim | G04G 21/08 368/69 |
| 2016/0241688 | A1* | 8/2016 | Vossoughi | B60R 11/02 |
| 2016/0320756 | A1* | 11/2016 | Lee | G04G 21/08 |
| 2017/0068448 | A1* | 3/2017 | Ghassabian | G06F 3/04886 |
| 2017/0160898 | A1* | 6/2017 | Lee | G06F 3/041 |
| 2018/0059903 | A1* | 3/2018 | Lim | G06F 3/02 |

OTHER PUBLICATIONS http://www.touchone.net/.
http://fivetiles.com/.
http://ibeezi.com/.
http://minuum.com/.
https://fleksy.com/.
http://www.swype.com/.
http://research.microsoft.com/en-us/downloads/3e3aaa26-804c-486e-b3d7-d394c733da90/.
https://www.exideas.com/ME/index.php.
http://www.flickkey.com/.
https://www.youtube.com/watch?v=njvitTKmvA4.
https://play.google.com/store/apps/details?id=com.michy.wearmessenger.
https://play.google.com/store/apps/details?id=com.appfour.wearmessages&hl=en.
https://play.google.com/store/apps/details?id=eir.writer.sms&hl=en.
http://www.asarif.com/pub/papers/Arif_HCIInt16_Smartwatch_Input.pdf.
http://tusi-types.squarespace.com.
http://www.academia.edu/18632986/Using_Hall_Effect_Sensors_for_3D_space_Text_Entry_on_Smartwatches.
https://pdfs.semanticscholar.org/a675/07d498916d505ae9e3db58c1ee6f19e5763f.pdf.
http://www.chrisharrison.net/index.php/Research/Zoomboard.
http://chrisharrison.net/projects/zoomboard/zoomboard.pdf.
http://phys.org/news/2013-04-zoomboard-smartwatch-text-entry-video.html.
http://autodeskresearch.typepad.com/blog/2014/09/it-is-indeed-possible-to-type-30-words-per-minute-on-a-smart-watch-.htm.
http://upcommons.upc.edu/bitstream/handle/2117/85348/Interaccion15ShortPaperFinal.pdf.
http://www.typetime.net/.
http://www.fastcodesign.com/3046742/this-smartwatch-keyboard-is-the-second-coming-of-t9.
http://www.dailymail.co.uk/sciencetech/article-3083404/A-smartwatch-TYPE-iType-Android-keyboard-just-six-keys-watch-used-without-phone.html.

* cited by examiner

SYSTEMS AND METHODS FOR TEXT ENTRY FOR MULTI-USER TEXT-BASED COMMUNICATION

BACKGROUND OF THE INVENTION

Portable devices such as smart phones, tablet computers, and smart watches are used for text-based communication between multiple users. In some such portable communication devices, new text-based messages are generated by entering text using a keyboard displayed on a touch-sensitive display.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
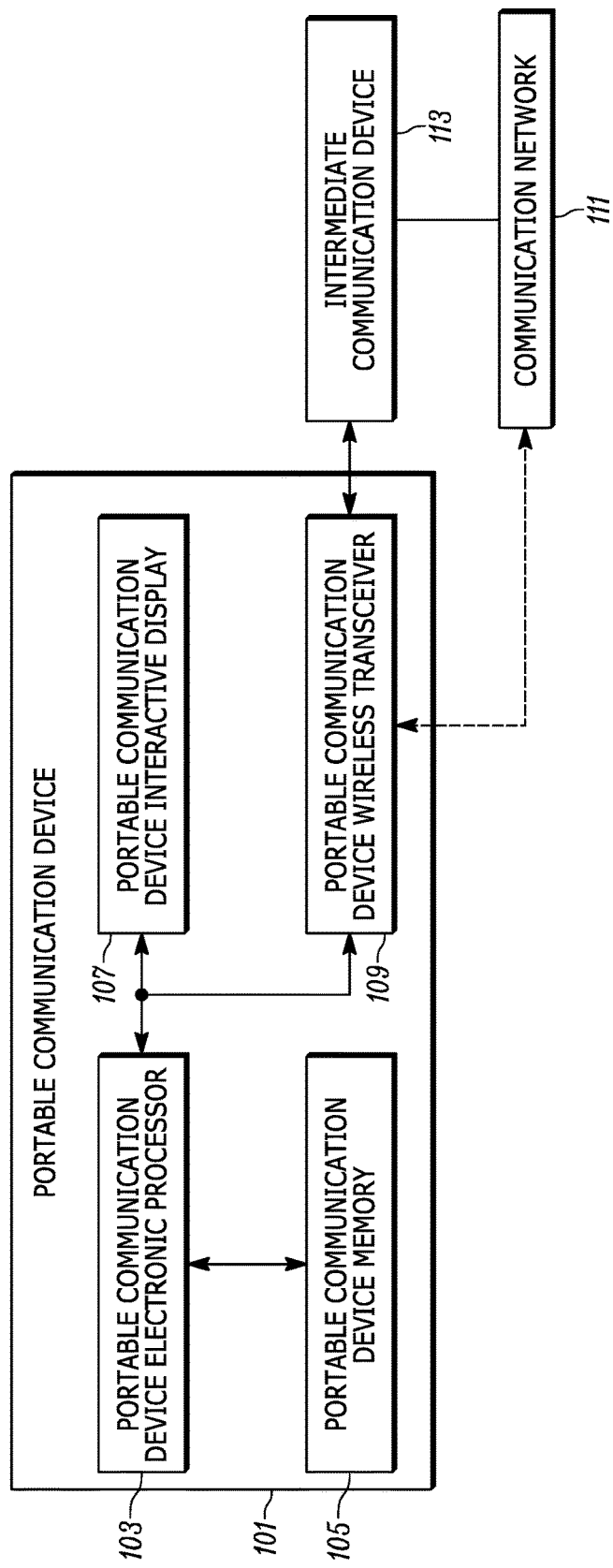
FIG. 1 is a block diagram of a portable device for text-based communication in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Systems and methods described in this disclosure provide for text entry for multi-user text-based communication using a portable communication device with a graphical user interface shown on a display. A plurality of text character icons are displayed on a display by an electronic processor in a center area of the graphical user interface and one or more messages are displayed along a perimeter area of the graphical user interface. The one or more messages include at least one of a message sent by the device or a message received by the device and messages are displayed in a chronological sequence. A selection of one or more text character icons in the center area of the graphical user interface is detected and a new text message is generate based on the detected selection of the one or more text character icons. The new text message is chronologically inserted and displayed in accordance with the chronological sequence along the perimeter of the graphical user interface. The new text message is then transmitted from the device.

FIG. 1 is a block diagram of one example of a portable communication device 101. The portable communication device 101 includes a portable communication device electronic processor 103 coupled to a portable communication device memory 105. The portable communication device memory 105 stores data and instructions that are executed by the portable communication device electronic processor 103 to provide the functionality and operation of the portable communication device 101 such as described below. The portable communication device 101 also includes a portable communication device interactive display 107. In some implementations, the portable communication device interactive display 107 includes a touch-sensitive display (i.e., a "touch-screen") or other interface device such as, for example, an "eye-gaze" activated display wherein icons are selected on a graphical user interface based on a detected direction of a user's eyes. In implementations that may include separate display and user input devices, the portable communication device interactive display 107 as described herein includes both the display component and the user input component.

As described in further detail below, the portable communication device 101 provides for text-based communication between the portable communication device 101 and other devices or components. The portable communication device electronic processor 103 generates new text-based messages based on inputs received through the portable communication device interactive display 107 and transmits the new text-based messages to other devices or systems through a portable communication device wireless transceiver 109. The portable communication device wireless transceiver 109 also receives text-based messages from other devices and systems and, in response, the portable communication device electronic processor 103 displays the received text-based messages on the portable communication device interactive display 107. In some implementations, the portable communication device wireless transceiver 109 communicates directly with a communication network 113 such as, for example, a cellular network, a land-mobile radio ("LMR") network, or a WiFi network. However, in other implementations, the portable communication device wireless transceiver 109 implements a short-range communication mechanism such as, for example, Bluetooth to communicate with an intermediate communication device 111, which relays text-based messages between the portable communication device 101 and the communication network 113.

For example, as described in various specific examples below, the portable communication device 101 may be implemented as a wrist watch (e.g., a "smart watch") that uses a short-range communication modality to communicate with a smart phone (i.e., the intermediate communication device 111). Text-based messages that are received by the smart phone are then transmitted to and displayed on the wrist watch. Similarly, a user may generate new text-based messages through a graphical user interface of the wrist watch, which are then transmitted to the smart phone to be communicated to other user devices.

Figure 2A:
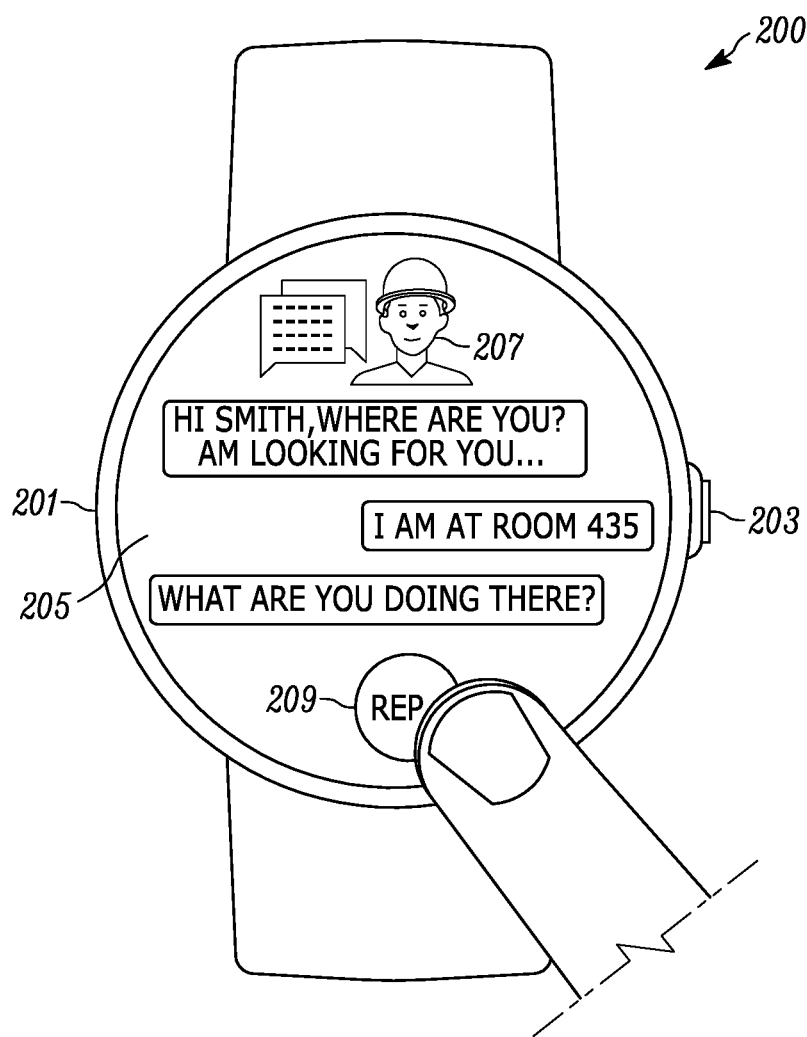
FIG. 2A is a front view of a wrist watch including the portable device of FIG. 1 and displaying a first graphical user interface in accordance with some embodiments.
Figure 2B:
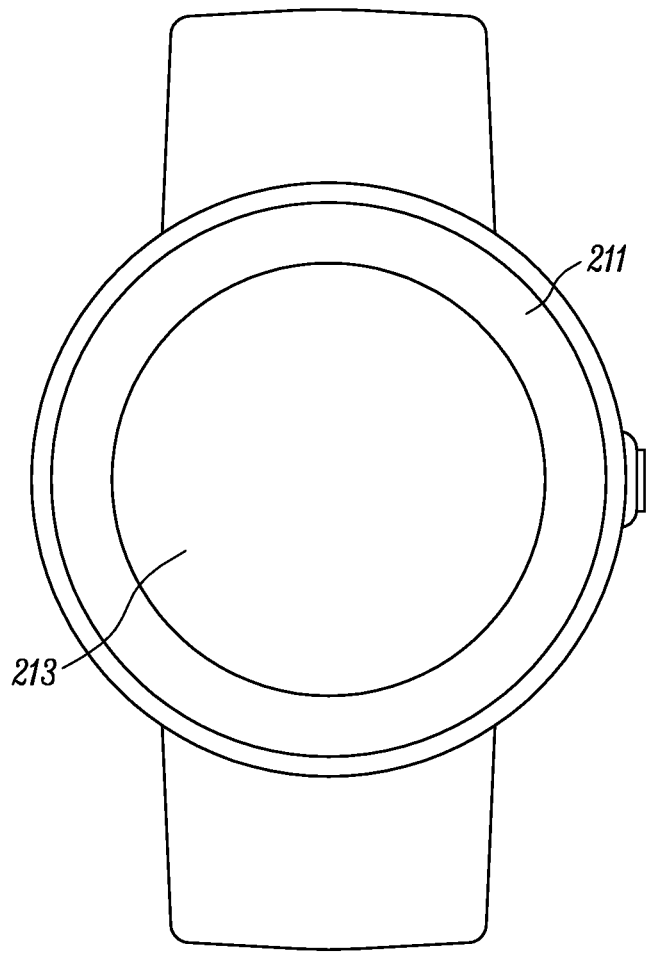
FIG. 2B is a schematic view of the wrist watch of FIG. 2A showing on-screen areas of a second graphical user interface for text entry in accordance with some embodiments.
Figure 2C:
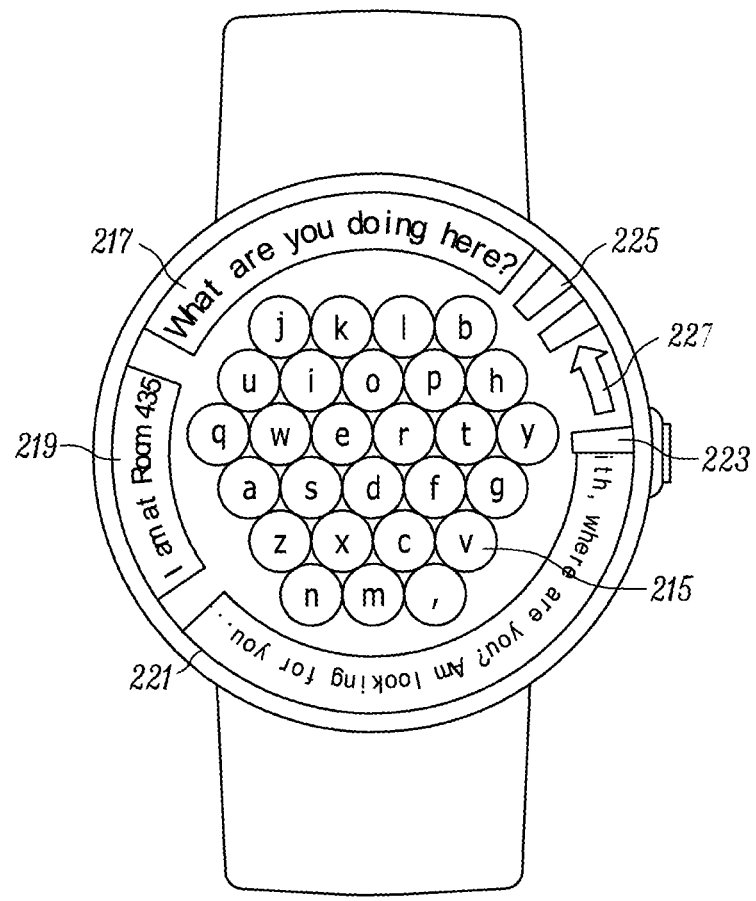
FIG. 2C is a front view of the wrist watch of FIG. 2A displaying the second graphical user interface for text entry arranged using the on-screen areas of FIG. 2B in accordance with some embodiments.

FIGS. 2A through 2C illustrate one example of the portable communication device 101 implemented as a wrist watch 200. In other implementations, the portable communication device 101 may be implemented as another type of wearable communication device. As shown in FIG. 2A, the wrist watch 200 includes a bezel 201 (or another type of housing) and a physical button 203 positioned on the side of the bezel 201. A touch-sensitive display 205 is positioned within the bezel 201. In the example of FIG. 2A, the touch-sensitive display 205 shows a first graphical user interface where a sequence of text-based messages are displayed in a vertical sequential arrangement—newer messages are displayed towards the bottom of the touch-sensitive display 205 and older messages are displayed towards the top. In the first graphical user interface of FIG. 2A, a picture or "avatar" associated with another user is displayed at the top of the touch-sensitive display 205 to identify a specific user associated with another device with which the wrist watch 200 is currently communicating (e.g., the sender of one or more text-based messages received by the wrist watch 200 and displayed on the touch-sensitive display 205).

The first graphical user interface of FIG. 2A also provides a "REPLY" icon 209 towards the bottom of the touch-sensitive display. In this particular example, a user of the wrist watch 200 will use the first graphical user interface shown in FIG. 2A to monitor and read newly received text-based messages and older text-based messages. However, in order to generate a new text-based message to be sent by the wrist watch 200 to another device, the user selects the "REPLY" icon 209, which causes a second graphical user interface to be displayed on the touch-sensitive display 205. As illustrated in FIG. 2B, the second graphical user interface generally divides the screen area of the touch-sensitive display into two areas—a perimeter area 211 positioned around the perimeter of the touch-sensitive display 205 near where the touch-sensitive display 205 contacts the bezel 201 and a center area 213 surrounded by the perimeter area 211.

FIG. 2C illustrates the second graphical user interface in further detail. A plurality of text character icons 215 is displayed in the center area 213 of the touch-sensitive display 205. In the example of FIG. 2C, the plurality of text character icons 215 includes lower case alphabetical characters; however, as discussed further below, the specific type of character icons displayed in the center area 213 can vary between different implementations or can be toggled by the user to provide additional character icons.

The perimeter area 211 of the touch-sensitive display 205 displays a plurality of text-based messages that have been either sent or received by the wrist watch 200. In the specific example of FIG. 2C, three text-based messages are displayed: a first text-based message 217, a second text-based message 219, and a third text-based message 221. In the example of FIG. 2C, the displayed text-based messages are color-coded to indicate the source of a specific message. For example, the first text-based message 217 and the third text-based message 221 are both displayed in a first color indicating that both messages were received from other devices while the second text-based message 219 is displayed in a second color indicating that the second text-based message 219 was generated and sent by the wrist watch 200.

The available text space in the perimeter area 211 in the example of FIG. 2C is bounded by an end-point 223 and a fixed cursor position 225. The end of the most recent message in the sequence of text-based messages (i.e., the first text-based message 217) ends at the fixed cursor position 225. The other messages are displayed in reverse chronological order relative to the fixed cursor position 225. The first text-based message 217 is the most recent, so it is displayed adjacent to the fixed cursor position. The second text-based message 219 was transmitted before the first text-based message 217 was received, so it is displayed adjacent to the first text-based message 217 opposite the fixed cursor position 225. Because the messages are displayed in reverse chronological order relative to the fixed cursor position 225, the second text-based message 219 (i.e., a previously received message) ends at a start position of the first text-based message 217 (i.e., the most recent message). The third text-based message 221 was received before the second text-based message 219 was transmitted and, therefore, it is displayed adjacent to the second text-based message 219 opposite the first text-based message 217.

The font size used in the example of FIG. 2C is static and, therefore, only a defined number of characters can be displayed in the perimeter area 211. Any text characters in the reverse chronological order of messages in excess of the defined number of displayable characters are not shown on the touch-sensitive display 205. Instead, the displayed portion of the text-based messages terminates at the end-point 223.

The second graphical user interface shown on the touch-sensitive display 205 in the example of FIG. 2C also includes a "rotation reset" icon 227 (or a rotation reset "button"). As discussed in further detail below, the fixed cursor position 225 remains fixed in some embodiments such that newly entered text is inserted at the same location on the touch-sensitive display 205. To accommodate editing of text-based messages before they are sent, the text displayed in the perimeter area 211 can be rotated. The rotation reset icon 227 is selected to return the displayed text to a default position such that the end of the most recent message is displayed at the fixed cursor position 225.

Figure 3A:
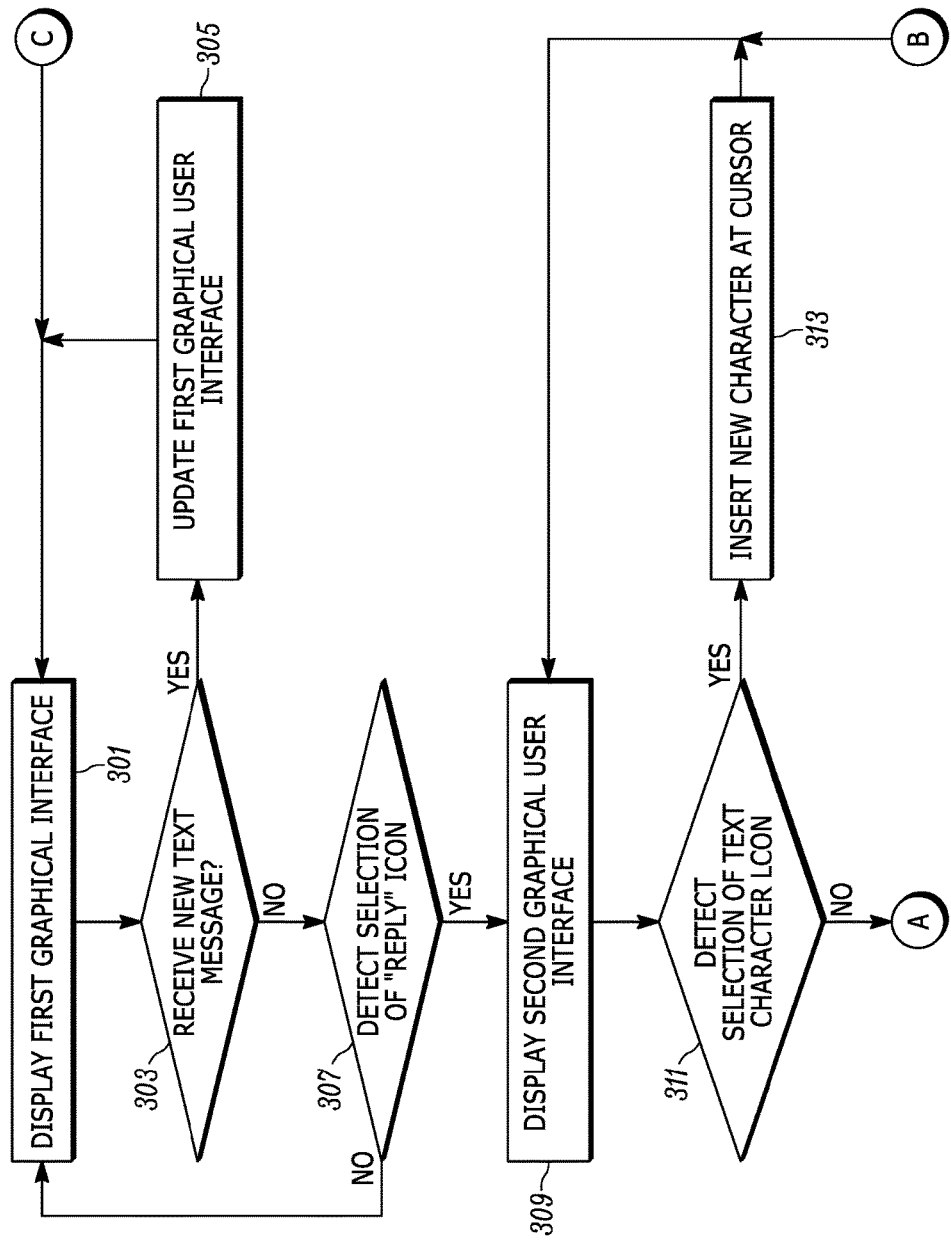
FIGS. 3A through 3B are a flowchart of a method of operating the wrist watch of FIGS. 2A through 2C to enter text to create and transmit a new text-based message in accordance with some embodiments.
Figure 3B:
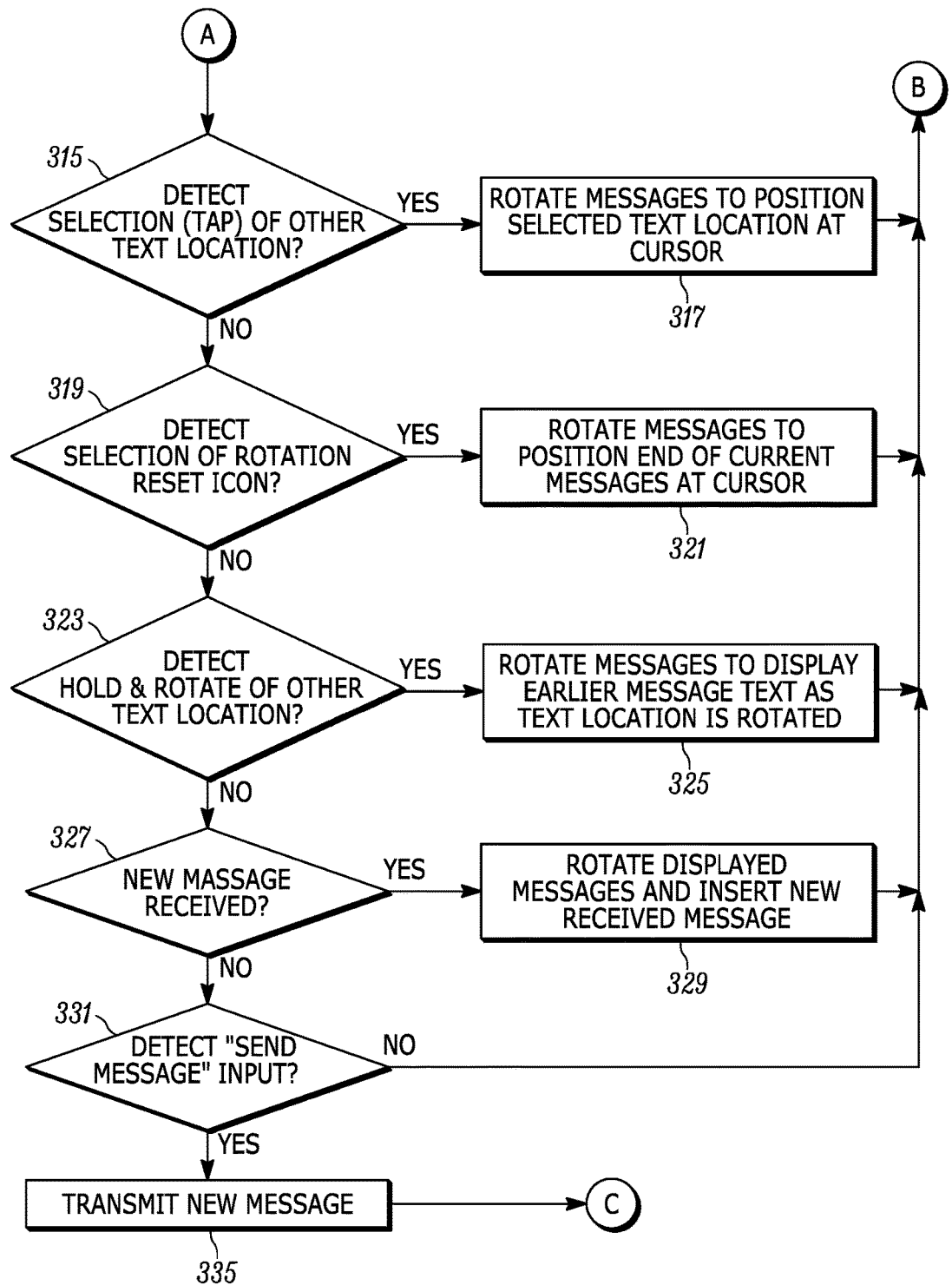

FIGS. 3A-3B illustrate a method implemented by the portable communication device electronic processor 103 to control the operation of the wrist watch 200 using the first graphical user interface and the second graphical user interface as illustrated in the examples of FIGS. 2A-2C. Beginning on FIG. 3A, the wrist watch 200 displays the first graphical user interface (i.e., FIG. 2A) at block 301. The wrist watch 200 monitors to determine whether any new text-based messages are received at block 303. If a new text-based message has been received, the first graphical user interface is updated to display the new text-based message at block 305. The portable communication device electronic processor 103 of the wrist watch 200 also monitors to determine whether the "REPLY" icon 209 has been selected at block 307. If the "REPLY" icon 209 has not been selected, then the wrist watch continues to display the first graphical user interface (i.e., block 301). However, when a selection of the "REPLY" icon 209 is detected, the second graphical user interface (i.e., FIG. 2C) is displayed at block 309 allowing the user to enter text and generate a new text-based message.

At block 311, the portable communication device electronic processor 103 of the wrist watch 200 monitors for a selection of one or more text character icons from the plurality of text character icons 215 displayed in the center area 213 of the touch-sensitive display 205. As new selections of text character icons are detected, new text characters are inserted at the fixed cursor position 225 at block 313 to generate a new text-based message. As new text characters are inserted, the messages displayed in the perimeter area 211 are rotated counter-clockwise to make room for the newly inserted text character at the fixed cursor position 225. The portable communication device electronic processor 103 of the wrist watch 200 then continues to display the second graphical user interface at block 309 and monitors for other inputs or events.

Continuing on FIG. 3B, at block 315, the portable communication device electronic processor 103 of the wrist watch 200 monitors for a selection of another text location in the new text-based message. To enable editing of the new text-based message at the selected location, the messages displayed in the perimeter area 211 are rotated clockwise at block 317 until the selected text location is positioned at the fixed cursor position 225. After the messages have been rotated at block 317, any newly entered text characters detected at block 311 (FIG. 3A) are inserted at block 313 (FIG. 3A) into the body of the new text message at the fixed cursor location.

At block 319, the portable communication device electronic processor 103 of the wrist watch 200 monitors for a selection of the rotation reset icon 227. When the rotation reset icon 227 is selected, the messages displayed in the perimeter area 211 are rotated counter-clockwise at block 321 until the end of the new text-based message is again displayed at the fixed cursor position 225. However, if the end of the new text-based message is already positioned at the fixed cursor position 225 when the rotation reset icon 227 is selected, then the messages displayed in the perimeter area 211 are not rotated in response to a selection of the rotation reset icon 227.

The second graphical user interface also enables a user to view text of earlier messages that are not currently displayed n the perimeter area 211. At block 323, the portable communication device electronic processor 103 of the wrist watch 200 detects a held selection and rotation of a text location in the perimeter area 211. In response, the messages displayed in the perimeter area 211 are rotated in the direction of the rotational input at block 325. As the detected input rotates in a clockwise direction, the earlier messages are displayed in the perimeter area 211 and more recent message text is removed from the perimeter area 211 as described in further detail below.

If a new text-based message is received at block 327 while the second graphical user interface is displayed, the new text-based message is inserted in an appropriate location in the chronological sequence at block 329. The messages displayed in the perimeter area 211 are rotated counter-clockwise to make room for the text of the new text-based message.

Finally, the portable communication device electronic processor 103 of the wrist watch 200 monitors for a "send message" input at block 331. In some implementations, the "send message" input can include a selection of another displayed icon or, as described further below, can include a specific gesture performed by the user on the touch-sensitive display 205. In response to detecting the "send message" input at block 331, the portable communication device electronic processor 103 of the wrist watch 200 transmits the new text-based message at block 335 to an intermediate communication device 111, to a communication network 113, or, in some implementations, directly to another portable communication device associated with the intended recipient(s) of the new text-based message. After the new text-based message has been transmitted, the portable communication device electronic processor 103 of the wrist watch 200 returns to displaying the first graphical user interface at block 301 until another selection of the "REPLY" icon 209 is detected at block 307 (FIG. 3A).

Figure 4A:
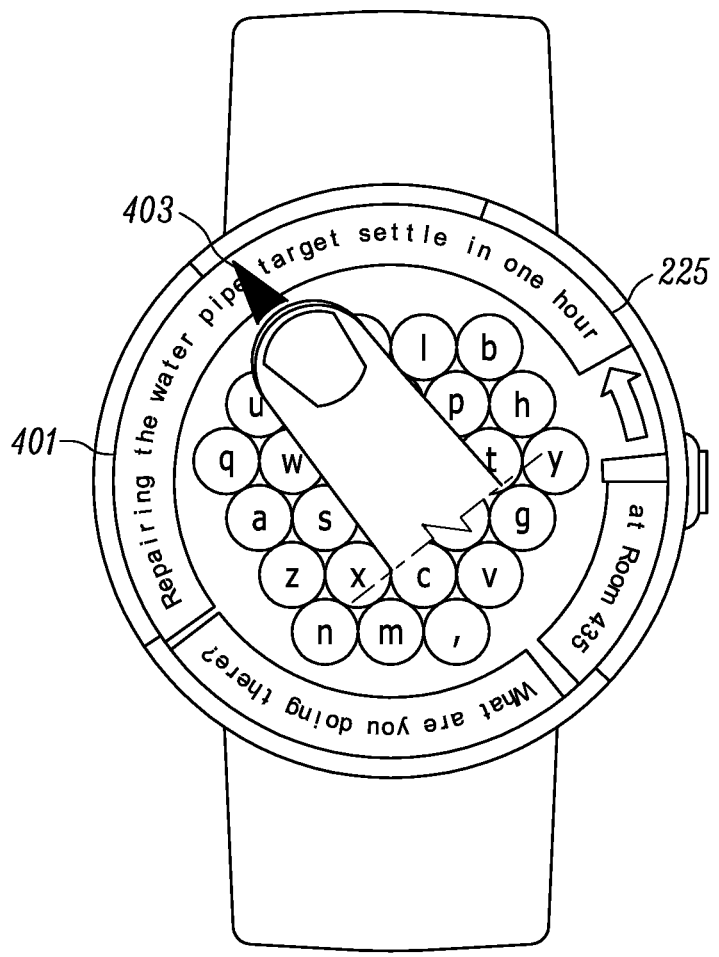
FIGS. 4A through 4C are front views of the wrist watch displaying the second graphical user interface of FIG. 2C as a new text-based message is edited to insert text in accordance with some embodiments.
Figure 4B:
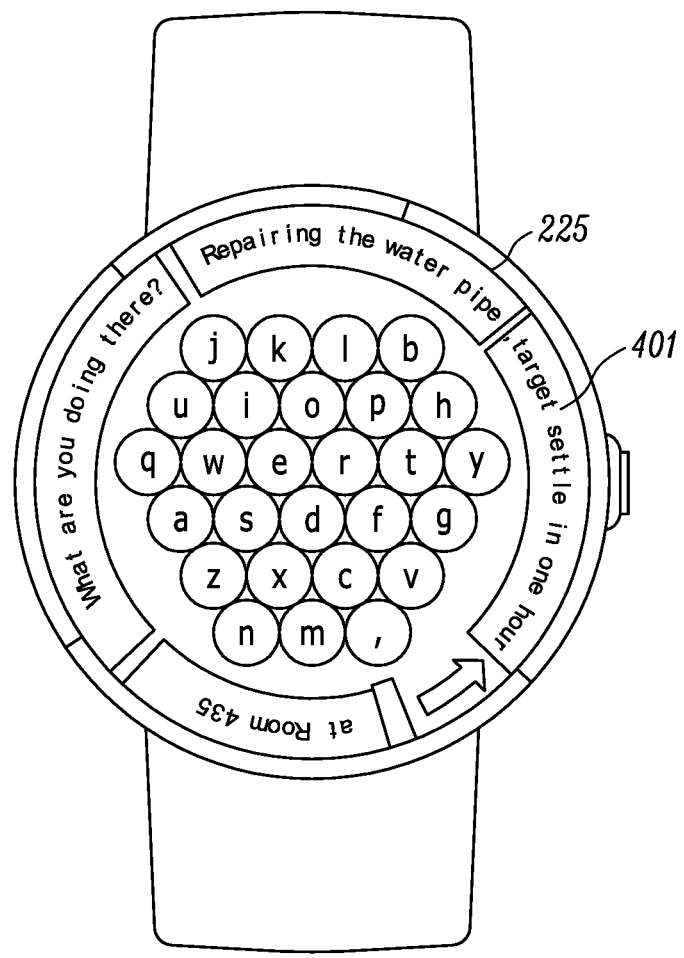
Figure 4C:
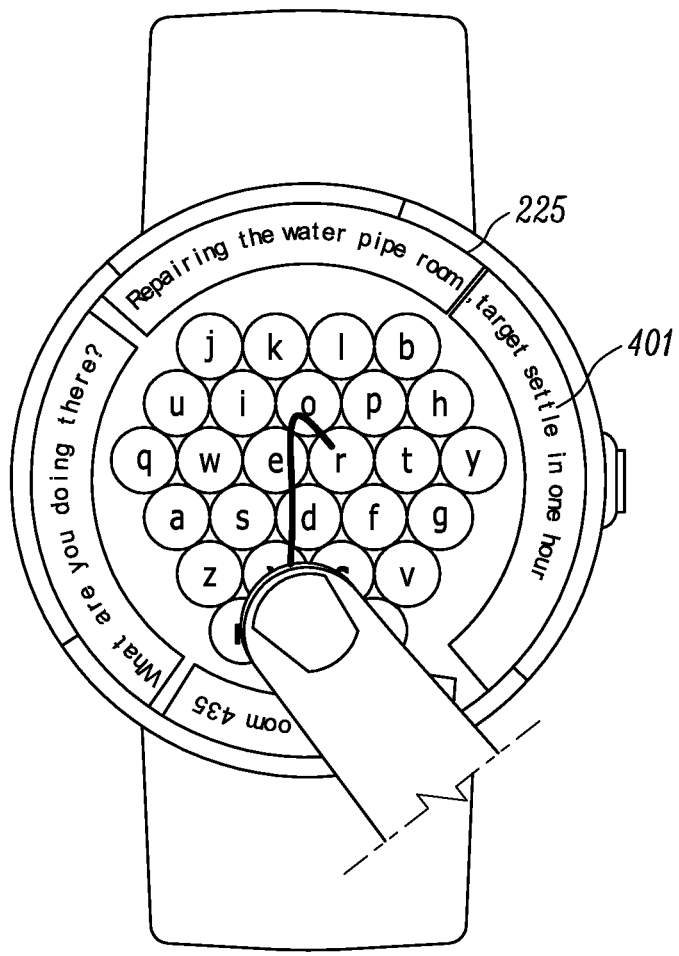
Figure 4D:
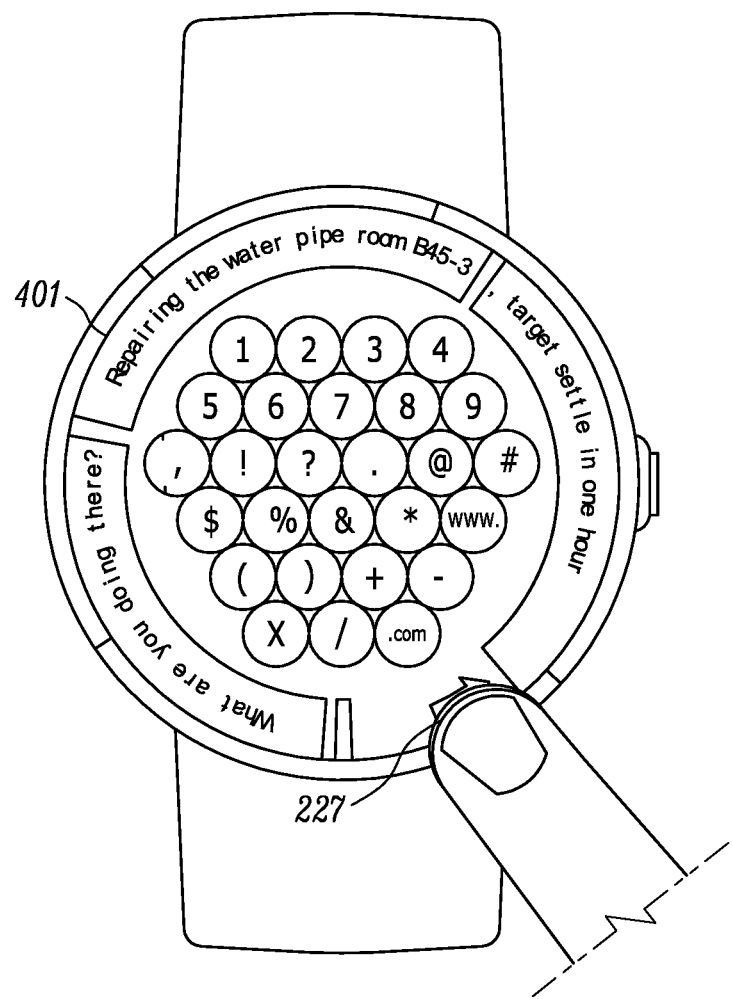
FIGS. 4D and 4E are front views of the wrist watch displaying the second graphical user interface of FIG. 2C as an end of a new text-based message is returned to a fixed cursor position in accordance with some embodiments.
Figure 4E:
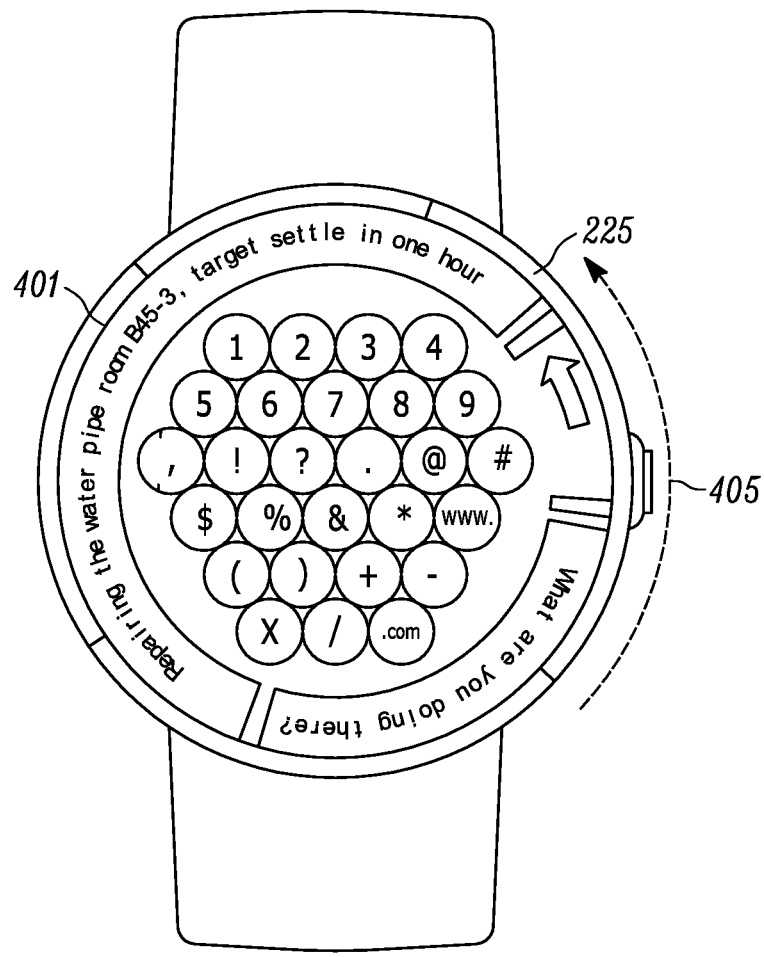

FIGS. 4A through 4F further illustrate some of the operations of the wrist watch 200 described above in the method of FIG. 3. In the example of FIG. 4A, a user is generating a new text-based message 401 using the second graphical user interface. As selections of the text character icons are detected, new text characters have been inserted at the fixed cursor position 225. However, in the example of FIG. 4A, the user now would like to edit the new text-based message 401 to include an additional word after the text "Repairing the water pipe." To do so, the user touches the touch-sensitive display 205 at the location 403 where the new text is to be inserted as shown in FIG. 4A (i.e., block 315 in FIG. 3). In response, the portable communication device electronic processor 103 causes the text displayed in the perimeter area 211 to rotate clockwise until the selected text location is positioned at the fixed cursor position 225 as shown in FIG. 4B (i.e., block 317 in FIG. 3). After the text has been rotated, new text characters are inserted into the body of the new text-based message 401 at the fixed cursor position 225 (i.e., block 313 in FIG. 3). As shown in the example of FIG. 4C, the word "room" has been inserted into the new text-based message 401. After completing the edit, the user selects the rotation reset icon 227 as shown in FIG. 4D (i.e., block 319 in FIG. 3) and, in response, the messages displayed in the perimeter area 211 of the touch-sensitive display 205 are rotated counter-clockwise (as indicated by arrow 405 in FIG. 4E) until the end of the new text-based message is located at the fixed cursor position 225 (i.e., block 321 in FIG. 3). Alternatively, the user may select another location within the new text-based message and, in response, the messages displayed in the perimeter area 211 are rotated either clockwise or counter-clockwise until the newly selected location within the new text-based message is located at the fixed cursor position 225.

Figure 4F:
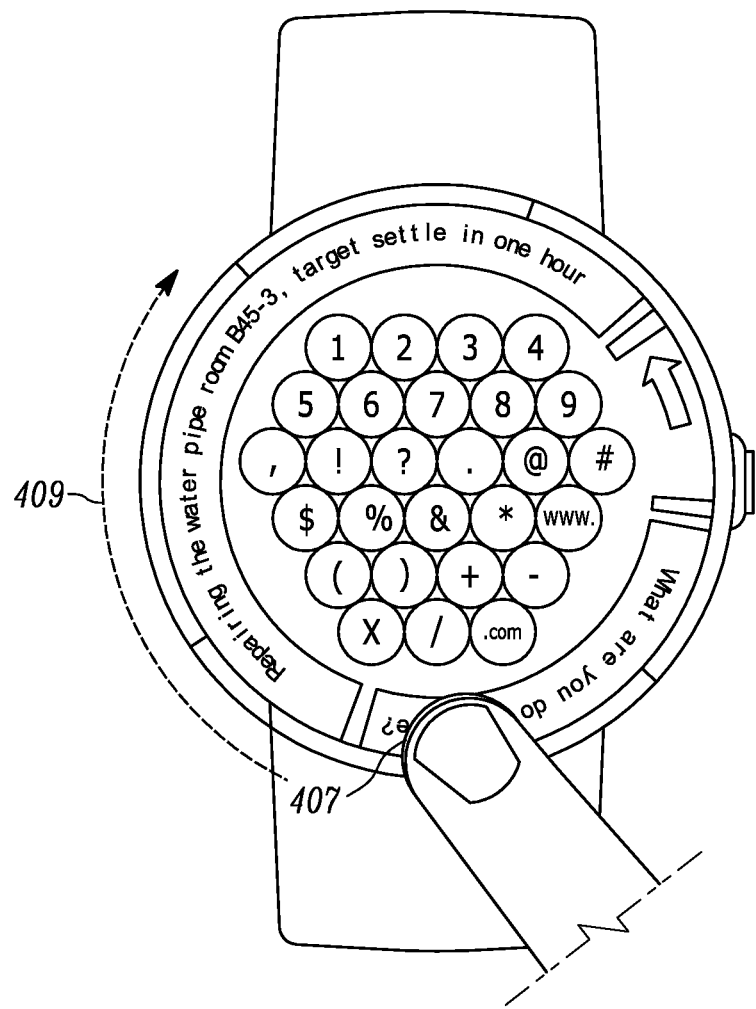
FIGS. 4F and 4G are front views of the wrist watch displaying the second graphical user interface of FIG. 2C as the messages displayed in the perimeter area are rotated to view text from older messages in accordance with some embodiments.
Figure 4G:
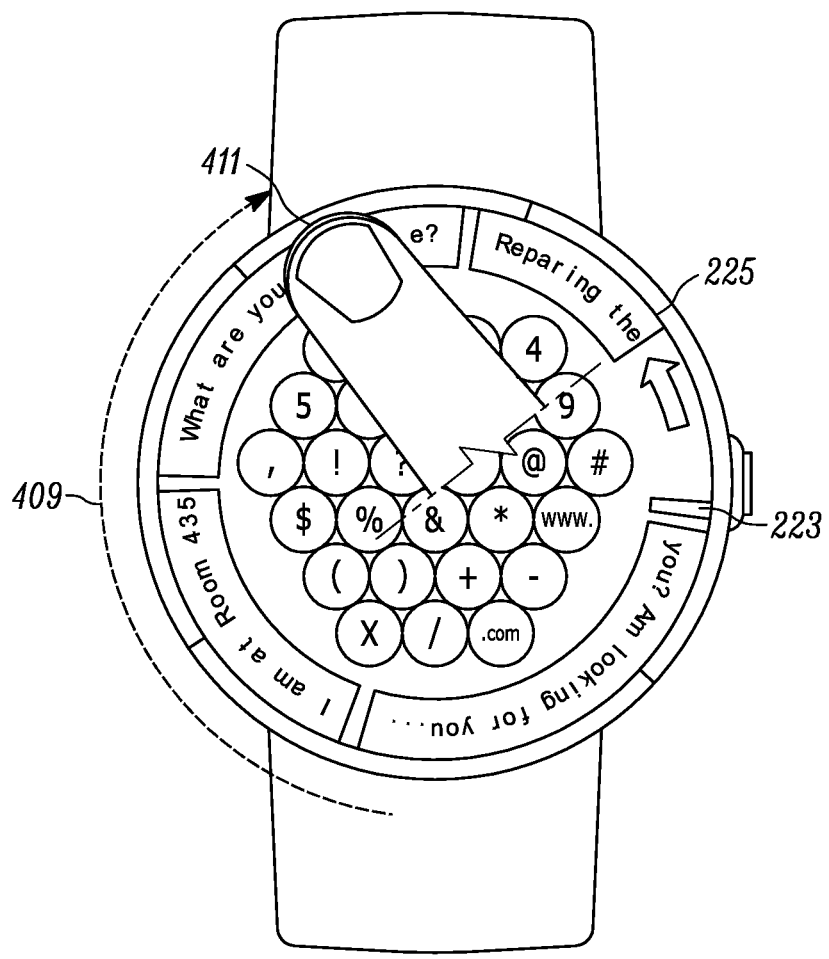

As discussed above, the text displayed in the perimeter area 211 is limited based on the font and size of the text. Text characters in earlier messages beyond the text characters that fit in the perimeter area 211 are not displayed on the second graphical user interface. As shown in FIG. 4F, to view older messages, a user selects a text location 407 in the perimeter area 211 and moves her finger around the perimeter area 211 as shown by the arrow 409 while maintaining contact with the touch-sensitive display 205. As the user's finger moves along the perimeter area 211, the displayed text correspondingly rotates with the movement of the finger until the selected text location 407 appears at a new location 411 in the perimeter area 211 as shown in FIG. 4G. As the text messages in the perimeter area 211 are rotated, additional text characters and earlier messages are gradually displayed at the end-point 223 and continue to rotate with the other text in the perimeter area 211. Conversely, text from more recent messages is removed from the screen as it rotates beyond the fixed cursor position 225. Maintaining contact with a text location 407 in a previous message while rotating the finger counter-clockwise will similarly cause the displayed text to rotate counter-clockwise as more recent message text is gradually displayed at the fixed cursor position 225 and older message text is removed from the screen as it rotates beyond the end-point 223.

Figure 4H:
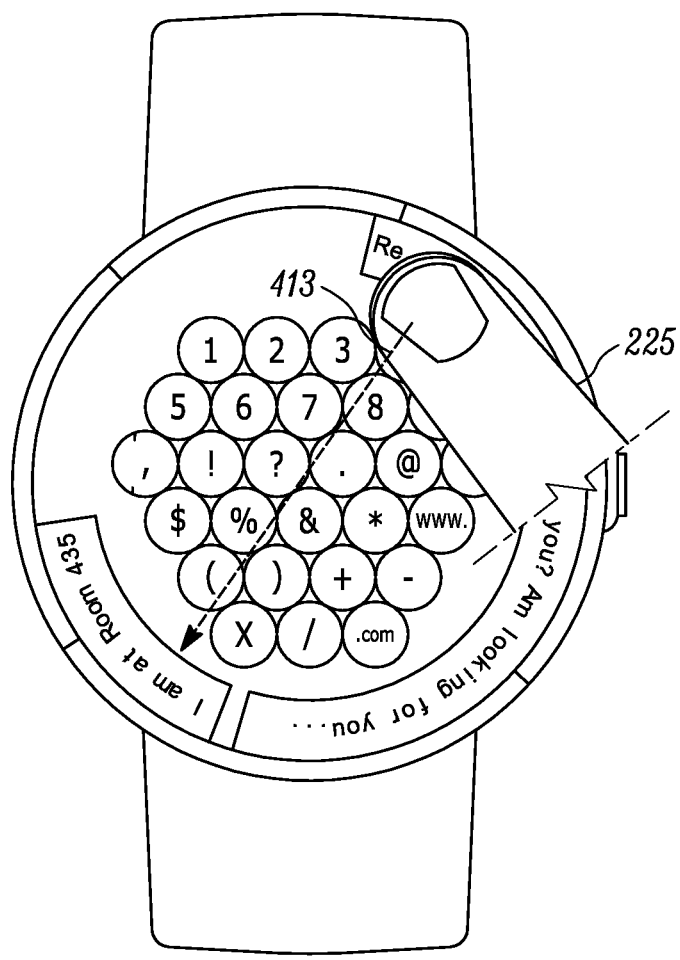
FIG. 4H is a front view of the wrist watch displaying the second graphical user interface of FIG. 2C as a user input is received causing the new text-based message to be transmitted in accordance with some embodiments.

Once the user has completed typing the new text-based message 401, a "send message" input is performed to cause the new text-based message 401 to be transmitted. In the example of FIG. 4H, the "send message input" is performed by placing the finger at the fixed cursor position 225 and swiping across the center area 213 of the touch-sensitive display 205 as indicated by the arrow 413 in FIG. 4H. When this action is detected (i.e., block 331 in FIG. 3B), the new text-based message 401 is transmitted (i.e., block 335 in FIG. 3B) and the first graphical user interface is again displayed on the touch-sensitive display 205 (i.e., block 301 in FIG. 3A).

Figure 5A:
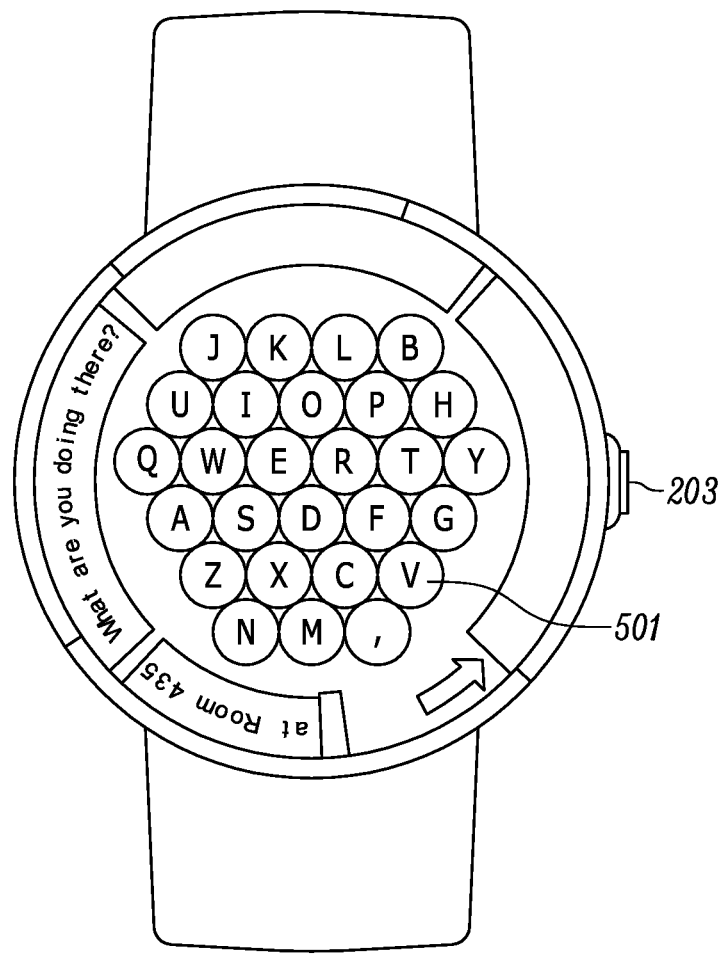
FIGS. 5A and 5B are front views of the wrist watch displaying the second graphical user interface of FIG. 2C toggling to alternative text character icons displayed in a center area of the second graphical user interface in accordance with some embodiments.
Figure 5B:
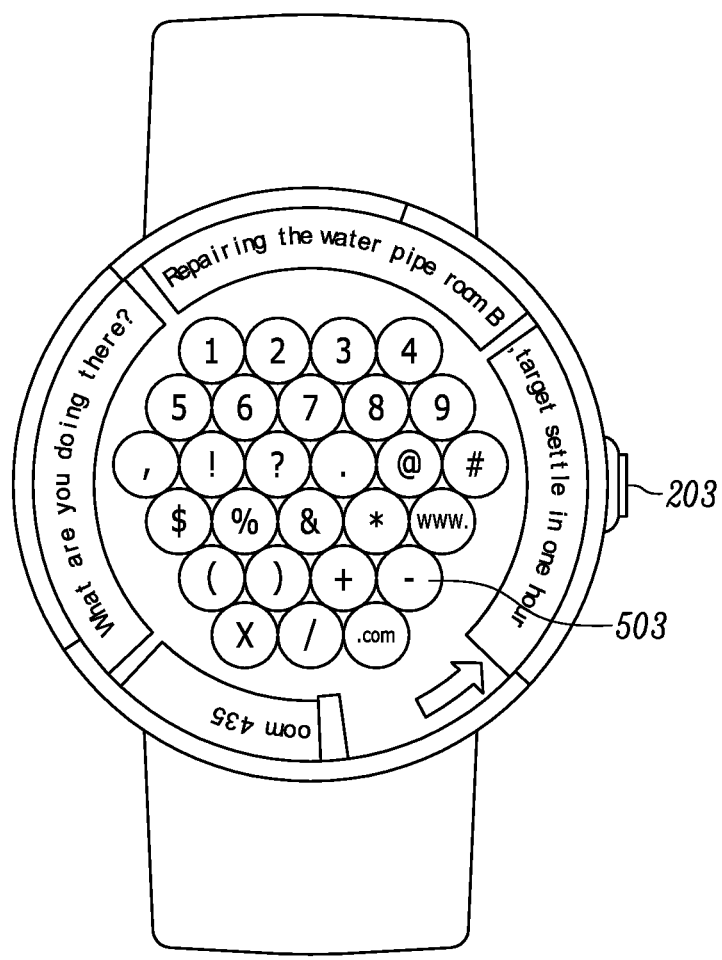

In the examples illustrated above, only lower-case alphabetical character icons are displayed in the center area 213 of the touch-sensitive display 205. However, in other implementations, different, more, or fewer text character icons can be displayed in the center area 213. Furthermore, in some implementations, a user can toggle between different selections of text character icons displayed in the center area 213. For example, in response to detecting a first selection of the physical button 203 while displaying the second graphical user interface, the plurality of text character icons 215 (i.e., the lower-case alphabetical characters) displayed in the center area 213 will be replaced with a second plurality of text character icons 501 as illustrated in FIG. 5A. This second plurality of text character icons 501 includes upper-case alphabetical character icons. In response to detecting a second selection of the physical button 203 while displaying the second graphical user interface, the second plurality of text character icons 501 (i.e., the upper-case alphabetical characters) displayed in the center area 213 will be replaced with a third plurality of text character icons 503 as illustrated in FIG. 5B. This third plurality of text character icons 503 includes numerical and other symbol characters. However, these specific sequences of toggled text character icons and the specific layout/size of the displayed icons are only one example. Other configurations, collections, and toggle mechanisms may be included in other implementations.

Figure 6A:
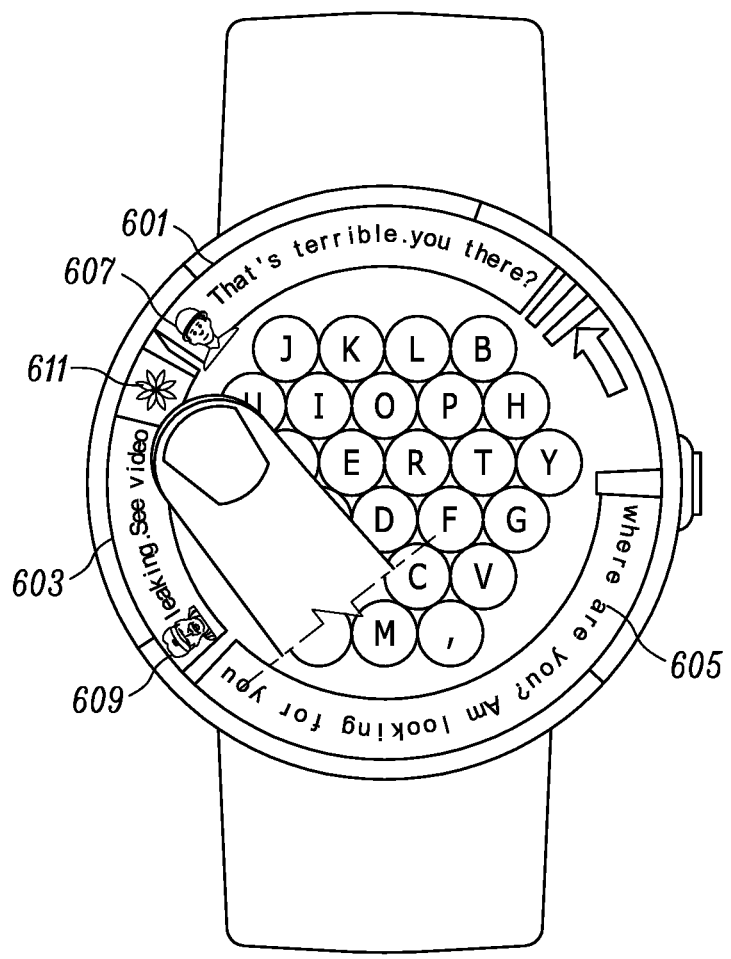
FIG. 6A is a front view of the wrist watch displaying the second graphical user interface of FIG. 2C displaying text-based messages from more than two users in accordance with some embodiments.

In some such, additional color-coding may be incorporated into the displayed text-based messages for communication between more than two users/devices as shown in the example of FIG. 6A. A first text-based message 601 was sent by a first user/device and is displayed in a first color. A second text-based message 603 received before the first text-based message 601 was sent by a second user/device and is displayed in a second color to indicate the different origin. Similarly, a third text-based message 605 received before the second text-based message 603 was sent by a third user/device and is displayed in a third color to indicate the origin of the message. In some implementations, the source of each individual text-based message is further identified (or alternatively identified) by displaying a picture or avatar of the user at the beginning of the text-based message. For example, in FIG. 6A, a picture 607 of the first user is displayed in the perimeter area 211 of the touch-sensitive display 205 before the text of the first text-based message 601 and, similarly, a picture 609 of the second user is displayed before the text of the second text-based message 603. Because the beginning of the third text-based message 605 is truncated by the end-point 223, no picture of the third user is displayed.

Figure 6B:
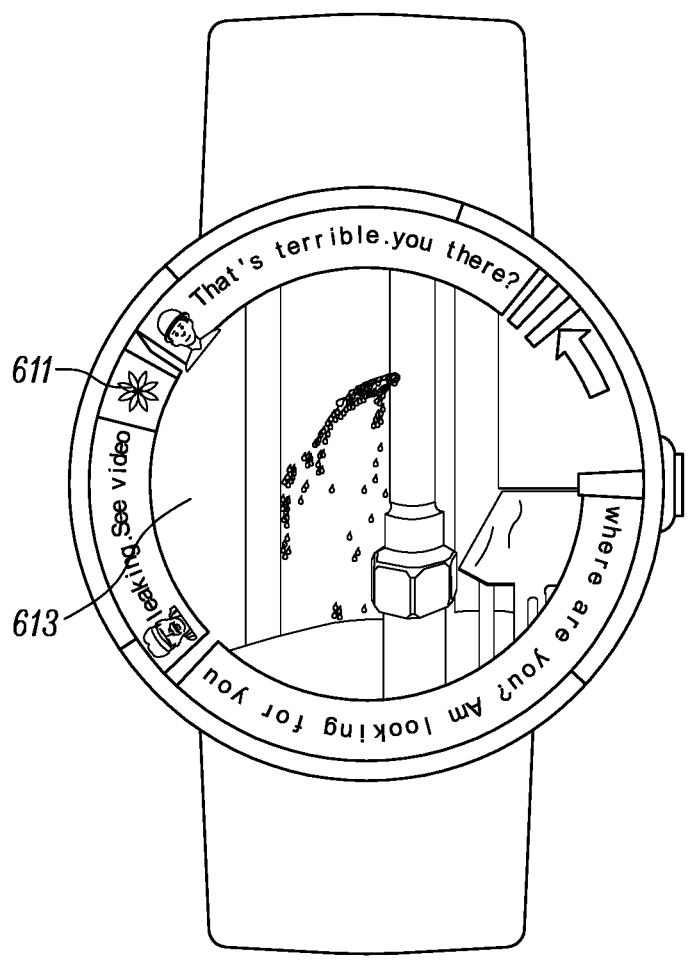
FIG. 6B is a front view of the wrist watch displaying the second graphical user interface of FIG. 2C showing a graphical image included in a message received by the portable device in accordance with some embodiments.

In addition to using color-coding and pictures to identify specific users/devices associated with each text-based message, in some implementations, pictures, videos, or audio can be received by the wrist watch 200 and viewed in the second graphical user interface. For example, in FIG. 6A, a video icon 611 is displayed within the body of the second text-based message 603. In response to detecting a selection of the video icon 611, the portable communication device electronic processor 103 causes a video 613 associated with the video icon 611 and received with the second text-based message 603 to be displayed in the center area 213 of the touch-sensitive display 205 as shown in FIG. 6B. In some implementations, the video icon 611 is a thumb-nail image from the video 613 while, in other implementations, the video icon 611 includes a more generic icon or a text-based link.

In the examples discussed above, the fixed cursor position 225 remains stationary in the second graphical user interface while the text displayed in the perimeter area 211 is rotated. In such implementations, a user always knows where new text is being added and does not need to visually search for a "cursor" icon. However, in other implementations, the cursor may be dynamically placed based on user input (i.e., cursor is placed where a user selects in a new text message). Furthermore, although the examples discussed above show the fixed cursor position 225 located 60° to the right of an apex of a circular-shaped touch-sensitive display (i.e., at "2 o'clock"), the fixed cursor position can be located at other locations in some implementations.

Figure 7:
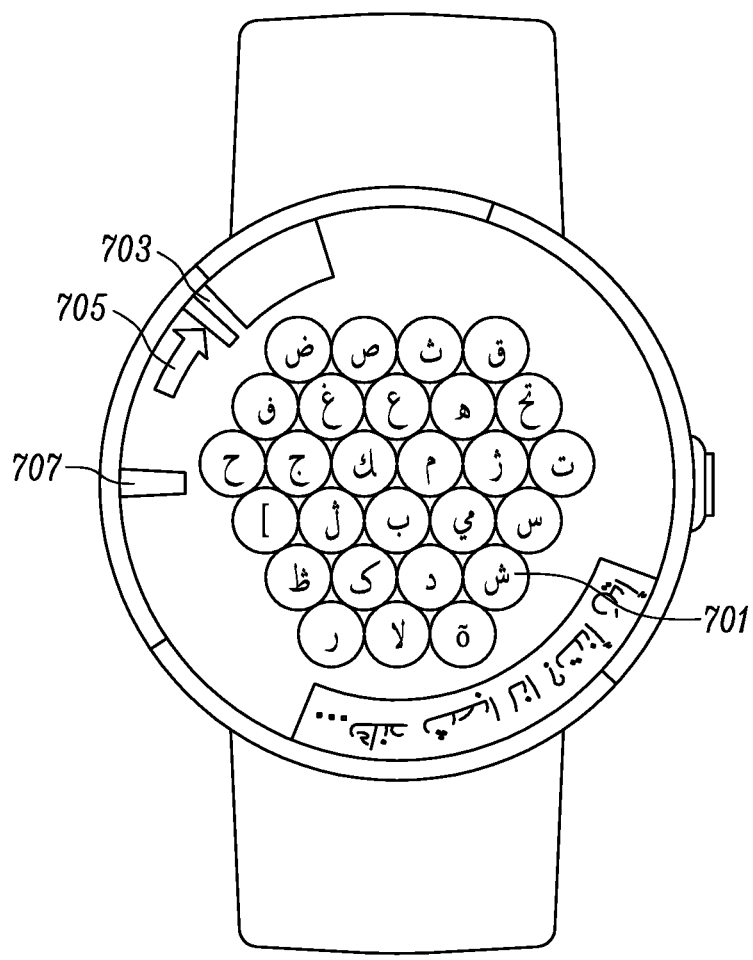
FIG. 7 is a front view of a wrist watch displaying a third graphical user interface for text-based communication using languages where text is read from right-to-left in accordance with some embodiments.

For example, FIG. 7 illustrates another example of a second graphical user interface for the wrist watch 200. In this example, the plurality of text character icons 701 displayed in the center area 213 are Arabic characters. Because this particular language is read from right-to-left, the fixed cursor position 703 is located at approximately 60° to the left of the apex of the circular touch-sensitive display 205. Similarly, the rotation reset icon 705 is located to the left of the fixed cursor position 703 and the end-point 707 is located to the left of the rotation reset icon 705. The text displayed in the perimeter area 211 is rotated clockwise as new text is inserted. In some implementations, the wrist watch 200 can be configured to utilize the fixed cursor position 703 and the layout illustrated in FIG. 7 or the fixed cursor position 225 and the layout illustrated in FIG. 2C, for example, based on language preferences set by the user.

Figure 8:
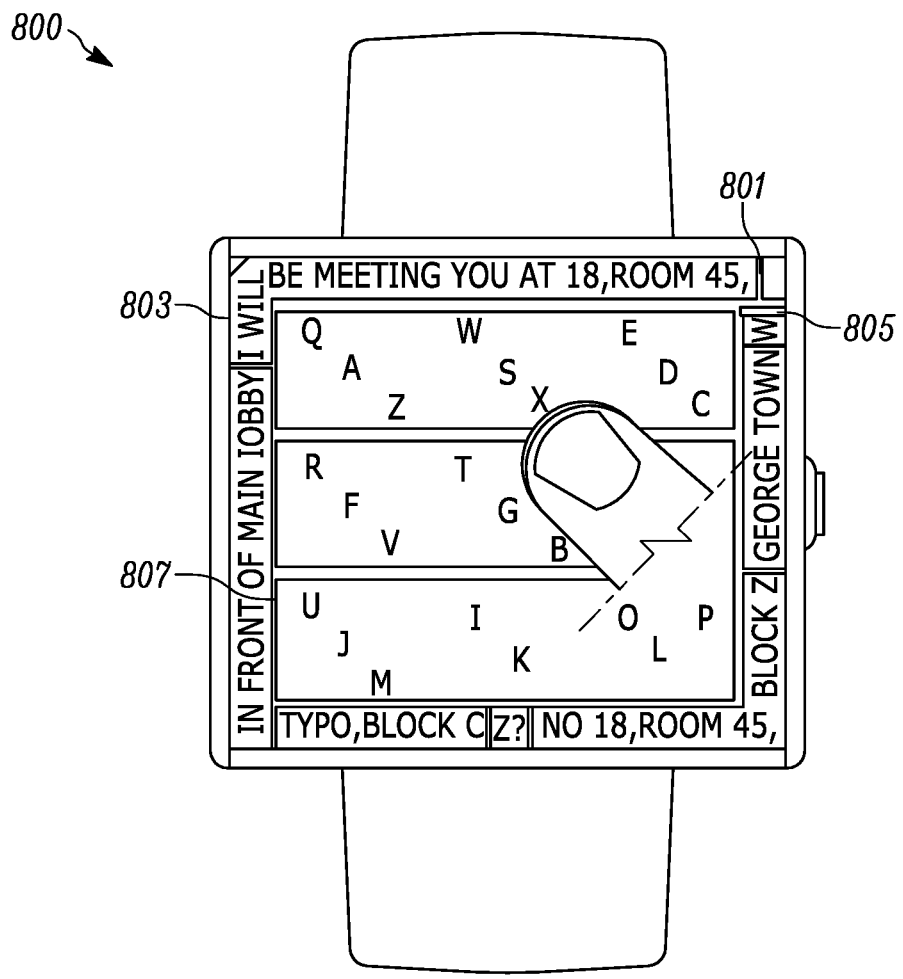
FIG. 8 is a front view of a square-faced wrist watch displaying a graphical user interface for text entry in accordance with some embodiments.

Furthermore, although the examples illustrated above discuss a circular-shaped watch face, the text entry mechanisms described in this disclosure can be implemented in other shapes. For example, FIG. 8 illustrates a second wrist watch 800 with a square-shaped bezel and a square-shaped touch-sensitive display. In the example of FIG. 8, the fixed cursor position 801 is also located generally in an upper right corner of the watch face, but, due to its square shaped, the fixed cursor position 801 is specifically located at a right end of a top side of the watch face. New text messages 803 rotate counter-clockwise around the perimeter of the display area as new text characters are inserted. An end-point 805 is located at a top end of a right side of the watch face. The center area 807 also includes the text character icons, but, again due to the square shape of the watch face in this implementation, the center area 807 is also square-shaped.

Figure 9:
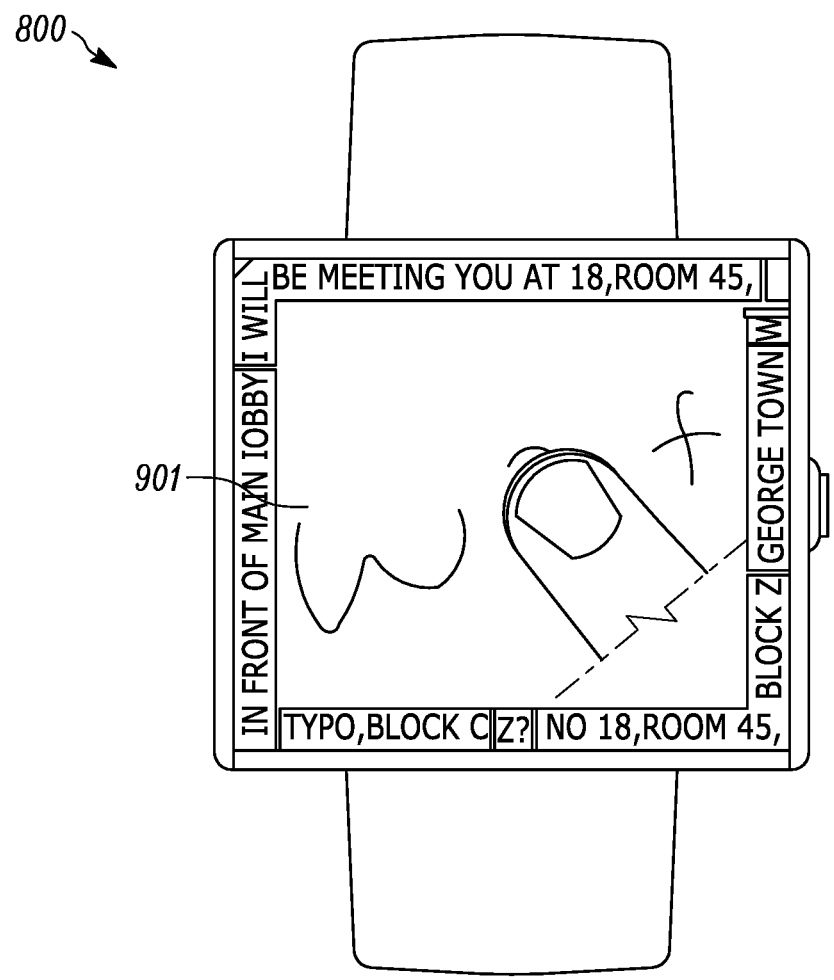
FIG. 9 is a front view of the square-faced wrist watch of FIG. 8 with an alternative text-entry mechanism in accordance with some embodiments.

As discussed above in reference to the example of FIG. 2C, in various different implementations, other specific layouts, sizes, and collections of text character icons can be used in the center area of the second graphical user interface. In the example of FIG. 8, text character icons are displayed in the center area 807 using a "nine-button" format. However, in some implementations, the text character icons displayed in the center area 807 can be replaced entirely with another character input mechanism. For example, as illustrated in FIG. 9, the center area of the watch face includes a text-recognition area 901 where a user enters text characters by tracing the shape of the text character in the text-recognition area 901.

Finally, although many of the examples discussed above are presented in the specific context of a wrist watch used for text entry, this text entry mechanism and various aspects of the graphical user interfaces discussed above can be embodiment in other portable communication devices. For example, the text entry mechanisms described above can be used on a smart phone, a tablet computer, or a head mounted display. The increased text character icons made possible by this text entry and display mechanism can, for example, make it easier for users to enter text on such other devices while wearing gloves.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of text entry for multi-user text-based communication using a portable communication device with a graphical user interface shown on a display, the method comprising:
　　displaying, on a display by an electronic processor, a plurality of text character icons in a center area of the graphical user interface;
　　displaying, on the display by the electronic processor, a plurality of messages in a perimeter area of the graphical user interface that surrounds the center area of the graphical user interface on all sides, the plurality of messages including at least one message selected from a group consisting of a message sent by the portable communication device and a message received by the portable communication device, wherein the plurality of messages are displayed as a single line of text characters in a chronological sequence along the entire perimeter area such that the characters of each message are displayed along an edge between the perimeter area and the center area and such that a final character of one message is adjacent to a first character of another message in the displayed chronological sequence;
　　detecting, by the electronic processor, a selection of one or more text character icons displayed in the center area of the graphical user interface;
　　generating, by the electronic processor, a new text message chronologically inserted and displayed in accordance with the chronological sequence along the perimeter area of the graphical user interface based on the detected selection of the one or more text character icons; and
　　transmitting, by the electronic processor, the new text message from the portable communication device.

2. The method of claim 1, wherein displaying the plurality of messages includes displaying the plurality of messages in the chronological sequence with a most recent message of the plurality of messages ending at a fixed cursor position along the perimeter area of the graphical user interface and previous messages of the plurality of messages displayed in reverse chronological order ending at a start position of the most recent message.

3. The method of claim 2, wherein displaying the plurality of messages further includes displaying a defined number of displayable characters along the perimeter area of the graphical user interface in reverse chronological order from the fixed cursor position such that characters from previously received messages in excess of the defined number of displayable characters are not displayed on the graphical user interface.

4. The method of claim 2, wherein displaying the plurality of messages in the chronological sequence with the most recent message of the plurality of messages ending at the fixed cursor position includes displaying the plurality of messages in the chronological sequence with the most recent message of the plurality of messages ending at the fixed cursor position at a location 60° from an apex of a circular-shaped graphical user interface.

5. The method of claim 2, wherein generating the new text message includes
　　rotating the plurality of displayed messages along the perimeter area of the graphical user interface to create space for a new text character at the fixed cursor position in response to detecting the selection of a text character icon, and
　　displaying the new text character at the fixed cursor position based on the detected selection of the text character icon.

6. A method of text entry for multi-user text-based communication using a portable communication device with a graphical user interface shown on a display, the method comprising:
　　displaying, on a display by an electronic processor, a plurality of text character icons in a center area of the graphical user interface;
　　displaying, on the display by the electronic processor, one or more messages along a perimeter area of the graphical user interface, the one or more messages including at least one message selected from a group consisting of a message sent by the portable communication device and a message received by the portable communication device, wherein the one or more messages are displayed in a chronological sequence, and wherein the center area of the graphical user interface is surrounded by the perimeter area,
　　　wherein displaying the one or more messages further includes displaying a defined number of displayable characters along the perimeter area of the graphical user interface in reverse chronological order from the fixed cursor position such that characters from previously received messages in excess of the defined number of displayable characters are not displayed on the graphical user interface;
　　detecting, by the electronic processor, a selection of one or more text character icons displayed in the center area of the graphical user interface;
　　generating, by the electronic processor, a new text message chronologically inserted and displayed in accordance with the chronological sequence along the perimeter area of the graphical user interface based on the detected selection of the one or more text character icons, wherein generating the new text message includes
　　　rotating the one or more messages displayed along the perimeter area of the graphical user interface to create space for a new text character at the fixed cursor position in response to detecting the selection of a text character icon, and
　　　displaying the new text character at the fixed cursor position based on the detected selection of the text character icon;
　　detecting a selection of a location in the new text message;
　　rotating the characters displayed along the perimeter area of the graphical user interface until the selected location in the new text message is displayed at the fixed cursor position;
　　detecting a selection of a text character icon;
　　inserting a new text character into the new text message at the selected location in the new text message based on the detected selection of the text character icon; and
　　transmitting, by the electronic processor, the new text message from the portable communication device.

7. The method of claim 6, further comprising:
　　displaying a rotation reset icon after the end of the new text message; and rotating the characters displayed along the perimeter area of the graphical user interface in response to detecting a selection of the rotation reset icon until an end of the new text message is positioned at the fixed cursor position.

8. The method of claim 1, further comprising:
displaying a first graphical user interface on the display, the first graphical user interface including the plurality of messages displayed chronologically from a top of the display towards a bottom of the display and including a reply icon;
detecting a selection of the reply icon; and
displaying a second graphical user interface on the display in response to detecting the selection of the reply icon, wherein displaying the second graphical user interface includes displaying the plurality of text character icons in the center area of the graphical user interface and displaying the plurality of messages along the perimeter area of the graphical user interface.

9. The method of claim 1, wherein displaying the plurality of text character icons in the center area of the graphical user interface and displaying the plurality of messages along the perimeter area of the graphical user interface includes displaying the plurality of text character icons in the center area of a touch-sensitive display and displaying the plurality of messages along the perimeter area of the touch-sensitive display, and
wherein detecting the selection of one or more text character icons displayed in the center area of the graphical user interface includes detecting the selection of one or more text character icons displayed in the center area of the touch-sensitive display.

10. The method of claim 1, further comprising providing the graphical user interface on a touch-sensitive display of a wrist watch.

11. The method of claim 10, wherein displaying the plurality of text character icons in the center area of the graphical user interface includes displaying a first plurality of text character icons in the center area of the touch-sensitive display of the wrist watch, and further comprising:
detecting a selection of a physical button positioned on a bezel of the wrist watch; and
toggling to display a second plurality of text character icons in the center area of the touch-sensitive display of the wrist watch in response to detecting the selection of the physical button.

12. A communication device for multi-user text-based communication, the communication device comprising:
a display configured to show a graphical user interface, the graphical user interface including a plurality of text character icons in a center area of the graphical user interface and a plurality of messages displayed in a perimeter area of the graphical user interface that surrounds the center area of the graphical user interface on all sides, the plurality of messages including at least one message selected from a group consisting of a message sent by the communication device and a message received by the communication device, wherein the plurality of messages are displayed as a single line of text characters in a chronological sequence along the entire perimeter area such that the characters of each message are displayed along an edge between the perimeter area and the center area and such that a final character of one message is adjacent to a first character of another message in the displayed chronological sequence;
an input device configured to detect a selection of one or more text character icons displayed in the center area of the graphical user interface;
an electronic processor configured to generate a new text message displayed in the chronological sequence along the perimeter area of the graphical user interface based on the detected selection of the one or more text character icons; and
a wireless transceiver configured to transmit the new text message from the communication device.

13. The communication device of claim 12, wherein the graphical user interface further includes a fixed cursor position along the perimeter area of the graphical user interface, wherein a most recent message of the plurality of messages ends at the fixed cursor position and previous messages of the plurality of messages are displayed in reverse chronological order from at a start position of the most recent message.

14. The communication device of claim 13, wherein the graphical user interface displays a defined number of characters along the perimeter area of the graphical user interface in reverse chronological order from the fixed cursor position such that characters from previously received messages in excess of the defined number of characters are not displayed on the graphical user interface.

15. The communication device of claim 13, wherein the display includes a circular-shaped display area, and wherein the fixed cursor position is located 60° from an apex of the circular-shaped display area.

16. The communication device of claim 13, wherein the graphical user interface is configured to
rotate the displayed text characters along the perimeter area of the graphical user interface to create space for a new text character at the fixed cursor position in response to detecting the selection of the text character icon, and
display the new text character at the fixed cursor position based on the detected selection of the text character icon.

17. The communication device of claim 16, wherein the graphical user interface is configured to
detect a selection of a location in the new text message,
rotate the plurality of messages displayed along the perimeter area of the graphical user interface until the selected location in the new text message is displayed at the fixed cursor position;
detect a selection of a text character icon; and
insert a new text character into the new text message at the selected location in the new text message based on the detected selection of the text character icon.

18. The communication device of claim 17, wherein the graphical user interface is further configured to
display a rotation reset icon after an end of the new text message, and
rotate the plurality of messages displayed along the perimeter area of the graphical user interface in response to detecting a selection of the rotation reset icon until the end of the new text message is positioned at the fixed cursor position.

19. The communication device of claim 12, wherein the display is further configured to
show a first graphical user interface on the display, the first graphical user interface including the plurality of messages displayed chronologically from a top of the display towards a bottom of the display and including a reply icon; and display a second graphical user interface on the display in response to detecting a selection of the reply icon, wherein the second graphical user interface includes the plurality of text character icons in the center area of the graphical user interface and the plurality of messages displayed along the perimeter area of the graphical user interface.

20. The communication device of claim 12, further comprising a touch-sensitive display, the touch-sensitive display including the display and the input device.

21. The communication device of claim 20, further comprising a wrist watch bezel housing, wherein the touch-sensitive display is coupled to the wrist watch bezel housing.

22. The communication device of claim 21, further comprising a physical button positioned on the wrist watch bezel housing, wherein the graphical user interface is configured to display a first plurality of text character icons in the center area of the graphical user interface and toggle to display a second plurality of text character icons in response to detecting a selection of the physical button.

* * * * *